United States Patent [19]

Everett et al.

[11] Patent Number: 4,596,412

[45] Date of Patent: Jun. 24, 1986

[54] TACTILE BUMPER FOR A MOBILE ROBOT OR PLATFORM

[75] Inventors: Hobart R. Everett, Springfield; Catherine S. Wright, Alexandria, both of Va.

[73] Assignee: The United States of America as represented by the Secretary of the Navy, Washington, D.C.

[21] Appl. No.: 703,848

[22] Filed: Feb. 21, 1985

[51] Int. Cl.⁴ .............................................. B60R 19/42
[52] U.S. Cl. .................................... 293/4; 200/61.44; 200/52 R; 293/149; 293/127
[58] Field of Search ................ 180/274; 293/126, 127, 293/149, 151, 152, 153, 154, 155, 4; 414/5; 901/1, 49; 200/61.44, 86.5, 86 R, 85 R, 52 R

[56] References Cited

U.S. PATENT DOCUMENTS 2,986,419  5/1961  Barényl ........................... 293/127 X
4,301,621 11/1981  Houweling .................. 200/61.43 X
4,397,372  8/1983  De Kraker .................... 200/61.44 X Primary Examiner—Leslie J. Paperner
Assistant Examiner—D. Glenn Dayoan Attorney, Agent, or Firm—Robert F. Beers; Kenneth E. Walden; John G. Wynn

[57] ABSTRACT

A tactile bumper is configured to obtain sensory information for impact detection and collision avoidance from the entire perimeter of an associated autonomous mobile robot or platform. The tactile bumper comprises a plurality of free-floating strips encased in a housing and is disposed in a spring-loaded fashion so as to normally be in an extended position. A plurality of microswitches are affixed to the housing and are arranged behind the plurality of free-floating strips in such a fashion so as to be activated by any displacement thereof. The most significant component(s) of the tactile bumper are a plurality of free-floating corner pieces, each of which is configured with an angled cut at its ends so as to mate with complementary angled cuts of juxtaposed ones of the plurality of free-floating strips. Thus, when a free-floating corner piece comes into contact with another surface, it will press against the juxtaposed free-floating strip(s), aforementioned, causing it, in turn, to activate the microswitch nearest to the free-floating corner piece.

9 Claims, 3 Drawing Figures

U.S. Patent Jun. 24, 1986 4,596,412
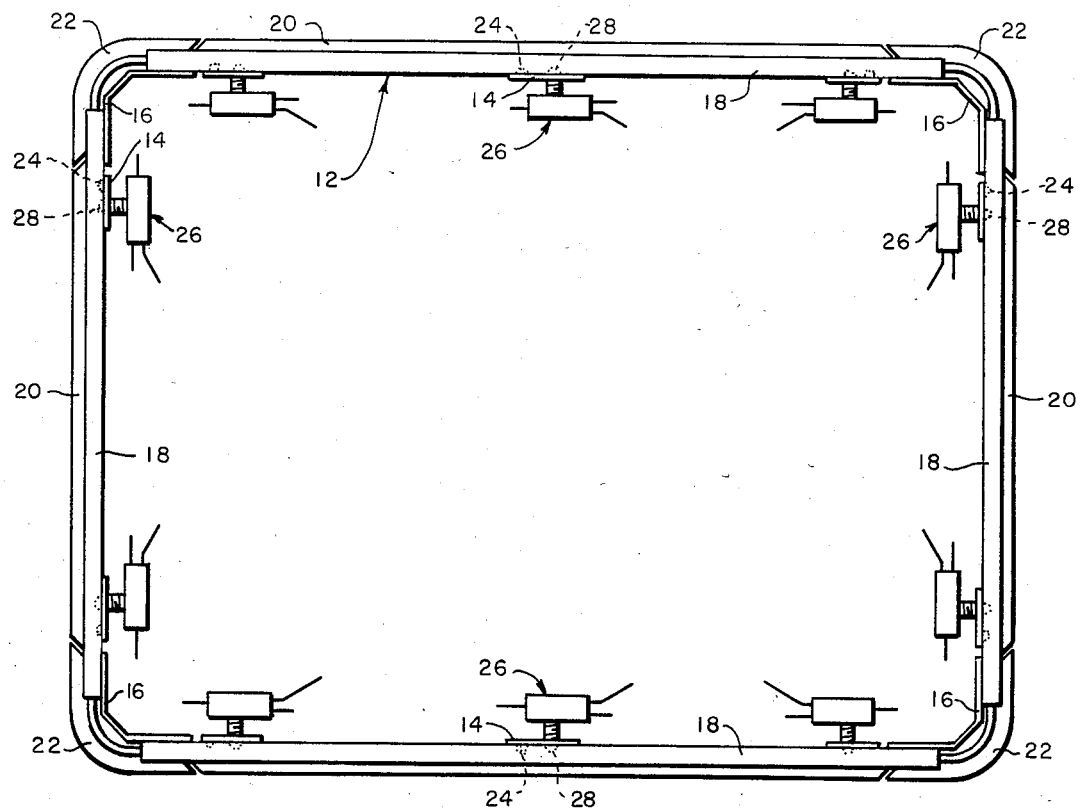
FIG. 1
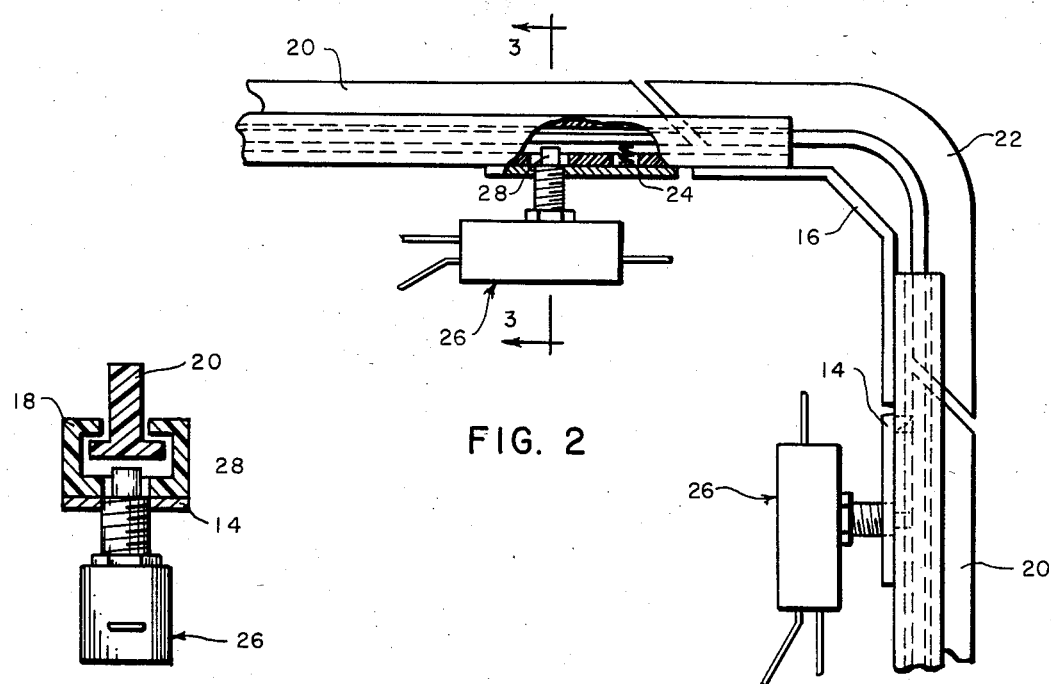
FIG. 2
FIG. 3

TACTILE BUMPER FOR A MOBILE ROBOT OR PLATFORM

BACKGROUND OF THE INVENTION

1. Field of the Invention

The present invention generally relates to bumpers for absorbing shock and preventing damage to vehicles on which they are attached, but more specifically the present invention relates to a tactile bumper for detecting the impact, in an improved manner, to any portion of a vehicle (for example, a mobile robot or platform) on which it is attached.

2. Description of the Prior Art

Apparatuses such as tactile bumpers for obtaining tactile sensory information from the perimeters of associated autonomous mobile robots or platforms, for the purpose of impact detection and collision avoidance, are well known in the prior art. The prior art tactile bumpers for accomplishing the foregoing generally consist of independent and discrete elements arranged in a discontinuous fashion around the mobile robot or platform being protected. One such prior art tactile bumper employs, inter alia, a plurality of hinged plates uniformly distributed around a circular base. The plurality of hinged plates are arranged in such a fashion that an inward force on any given one thereof will cause activation of a corresponding one of a plurality of spring-loaded momentary switches, each being mounted behind its corresponding hinged plate. The principal disadvantages arising form the foregoing configuration are the discontinuities between the individual hinged plates and the inability of the hinged plates, due to their constrained motion, to adequately respond to oblique impacts. Consequently, there is a need in the prior art to configure a tactile bumper to have the capability of continuous detection with no discontinuities. A corollary need in the prior art is to configure the tactile bumper to detect an impact from any angle in a plane horizontal thereto.

Another prior art tactile bumper employes a plurality of spring-loaded contact bars, each being disposed end-to-end, and in some cases, in an overlapping fashion at the corners of the associated mobile robot or platform. This prior art tactile bumper suffers to an even greater degree from the problems associated with the first mentioned prior art tactile bumpers, in that it reacts poorly to contact forces that are not normal to the surface of the particular one of the spring-loaded contact bars being employed. In addition, the plurality of spring-loaded contact bars can snag on obstructions that impact at the discontinuities between adjacent ones of thereof. This severely limits the functional reliability of any system in which this tactile bumper is used. In fact, this tactile bumper can cause damage to the vehicle in which it is used and/or the object encountered. Hence, there is a need in the prior art to configure a tactile bumper to be smooth and continuous, and to detect impact, in an improved manner, from any direction to any portion of the vehicle's circumference, but yet be free from discontinuities that could catch on surroundings. There is an additional need in the prior art to configure the tactile bumper to include a floating member to perform the impact sensing function with substantially no contraints on its motion.

The prior art, as indicated hereinabove, include some advancements in tactile bumpers for impact detection and collision avoidance. However, insofar as can be determined, no prior art tactile bumper incorporates all of the features and advantages of the present invention.

OBJECTS OF THE INVENTION

Accordingly, an important object of the present invention is to configure a tactile bumper to have the capability of continuous impact detection, with no discontinuities, for collision avoidance, in an improved manner.

Another important object of the present invention is configure the tactile bumper to detect an impact from any angle in a plane horizontal thereto, in an improved manner.

Still another important object of the present invention is to configure the tactile bumper to geometrically resolve the point of impact thereon for an intelligent response.

A corollary important object of the foregoing object is to generate upon impact sensory information (microswitch closures) that is simple to decode and that requires minimal processing.

Yet another important object of the present invention is to configure the tactile bumper to double as a protective bumper for its associated autonomous mobile robot or platform, in an improved manner.

A further important object of the present invention is to configure the tactile bumper to be simple in design and construction and inexpensive to fabricate, but yet be flexible in terms of its size and shape so that it can be used with a substantial number of different associated autonomous mobile robots or platforms.

SUMMARY OF THE INVENTION

In accordance with the above stated objects, other objects, features and advantages, the primary purpose of the tactile bumper of the present invention is to obtain tactile sensory information for continuous impact detection and collision avoidance from the entire perimeter of an associated autonomous mobile robot or platform, without discontinuities.

The essence of the present invention is in configuring the tactile bumper to be responsive to oblique impacts, i.e., detect an impact from any angle in a plane horizontal thereto, but yet be continuous and collapsible in design.

The purpose of the present invention is carried out by configuring the tactile bumper to include a plurality of free-floating strips encased in a fixed housing and disposed in a spring-loaded fashion so as to normally be in an extended position. Particular ones of a plurality of microswitches are operatively connected to the housing and arranged behind the plurality of free-floating strips in such a manner as to be activated by any displacement of the corresponding one of the plurality of free-floating strips. The tactile bumper further includes a plurality of free-floating corner pieces. Each one of the plurality of free-floating corner pieces is configured with an angled cut at its two ends so as to mate with complementary angled cut ends of juxtraposed ones of the plurality of free-floating strips. When a free-floating corner piece comes into contact with another surface or obstruction, it will press against the corresponding one(s) of the plurality of strips and cause it, in turn, to activate the microswitch nearest the free-floatinq corner piece impacted. In additional, the angled cut configuration, permits lateral motion of each of the plurality of strips within the housing when responding to oblique impacts.

BRIEF DESCRIPTION OF THE DRAWINGS

The foregoing and other objects, novel features and advantages of the present invention will be more apparent from the following more particular description of the preferred embodiment as illustrated in the accompanying drawings, in which:

FIG. 1 is a plan view of a tactile bumper depicting, inter alia, a housing, a plurality of microswitches, a plurality of free-floating strips and a plurality of free-floating corner pieces, according to the present invention;

FIG. 2 is an enlarged partial plan view of the tactile bumper of FIG. 1, illustrating the technique for mating each of the plurality of free-floating corner pieces with juxtaposed ones of the plurality of free-floating strips, according to the present invention; and FIG. 3 is a cross-sectional view of the tactile bumper of FIG. 2 taken along lines 3—3 thereof, depicting the operative arrangement of the components thereof, according to the present invention.

BRIEF DESCRIPTION OF THE PREFERRED EMBODIMENT

FIG. 1 shows an embodiment of a tactile bumper 10 in which the present invention is employed to obtain tactile sensory information for the purpose of impact detection and collision avoidance from the entire perimeter of an autonomous mobile robot or platform (not shown). The tactile bumper 10 comprises a housing 12, which includes a plurality of support plates 14, a plurality of support brackets 16 and a plurality of encasings 18. The tactile bumper 10 further comprises a plurality of free-floating strips 20, a plurality of free-floating corner pieces 22, a plurality of extension springs 24 and a plurality of microswitches 26. The plurality of microswitches 26 each includes a microswitch actuator 28.

Still referring to FIG. 1, but also to FIGS. 2 and 3 as viewed concurrently, the unique aspects of the configuration and fabrication of the tactile bumper 10 will now be described. As shown, at least two of the plurality of support plates 14 of housing 12 are affixed to each one of the plurality of encasings 18 near its ends. On each of the longer ones of the plurality of encasings 18, an additional one of the plurality of support plates 14 is affixed near the middle thereof. Also, juxtaposed ones of the plurality of encasings 18 are affixed at their ends to corresponding ones of the plurality of support brackets 16.

To continue, each one of the plurality of extension springs 24 is affixed to each corresponding one of the plurality of support plates 14, aforementioned, so as to protrude through its associated one of the plurality of encasings 18. Likewise, each one of the plurality of microswitches 26 is affixed to each corresponding one of the plurality of support plates 14 so that each of the plurality of microswitch actuators 28 protrude through its associated one of the plurality of encasings 18. The fabrication of the tactile bumper 10 is completed by slidably fitting the plurality of free-floating strips 20 into the corresponding ones of the plurality of encasings 18, and slidably fitting the plurality of free-floating corner pieces 22 into juxtaposed ones of the plurality of encasings 18, aforementioned (see FIG. 3).

STATEMENT OF THE OPERATION

Details of the operation, according to the present invention, are explained in conjunction with FIGS. 1, 2 and 3 viewed concurrently.

Referring primarily to FIGS. 2 and 3, the tactile bumper 10 is an improvement over other tactile bumpers, inter alia, because it is configured to completely circumscribe the base of an associated autonomous mobile robot or platform (not shown) to be protected. In operation, the plurality of free-floating strips 20 are encased in the plurality of encasings 18 of the housing 12 so as to be spring-loaded by the plurality of extension springs 24 into a normally extended position away from the plurality of microswitch actuators 28 of the plurality of microswitches 26. The plurality of microswitches 26 are arranged adjacent to the plurality of free-floating strips 20 in such a fashion so as to be activated by any displacement thereof.

Still referring primarily to FIGS. 2 and 3, when the tactile bumper 10 comes into contact with another surface, the particular one of the plurality of free-floating strips 20 in contact with the surface is locally depressed, and, in turn, activates the appropriate one of the plurality of microswitches 6, via the corresponding one of the plurality of microswitch actuators 28. This coaction provides geometric resolution of the point of impact, in the form of switch closure information, to an associated microprocessor based collision avoidance system (not shown). The associated microprocessor based collision avoidance system then responds by moving the associated autonomous mobile robot or platform (not shown) away from the detected point of impact. The particular one of the plurality of free-floating strips 20 affected is then returned to its original position by the one of the plurality of extension springs 24 nearest the aforementioned appropriate one of the plurality of microswitches 26. This original or extended position is clearly shown in FIG. 2.

The most significant components of the tactile bumper 10 are the plurality of free-floating corner pieces 22 each one of which is configured with an angled cut at its ends so as to mate with complementary angled cuts of juxtaposed ones of the plurality of free-floating strips 20. In operation, when one of the plurality of free-floating corner pieces 22 comes into contact with another surface, it will press against the operative one(s) of the juxtaposed ones of the plurality of free-floating strips 20, causing it, in turn, to activate the one of the plurality of microswitches 26 nearest thereto. The angled cut configuration permits lateral motion of the plurality of free-floating strips 20 within their corresponding plurality of encasings 18 when responding to oblique impacts. This feature is the key to the continuing yet collapsible floating configuration.

For purposes of the present invention, the plurality of support plates and brackets 14 and 16, respectively, are fabricated of steel or a similar material. The plurality of encasings 18 are fabricated of plastic or a similar material. The plurality of free-floating strips and corner pieces 20 and 22, respectively, are also fabricated of plastic or a similar material.

The plurality of free-floating strips 20 can be cut to any length so as to fit any size rectangular base with minimal deviation from the preferred embodiment shown in FIG. 1. Also, it should be clear that the plurality of free-floating corner pieces 22 can be fabricated in varying configurations so as to accommodate hexagonal or even circular bases.

The plurality of free-floating corner pieces 22 can be configured to any size, shape or angles to fit any shape and size base. For example, it can be made to fit the hexagonal or circular bases, aforementioned, by changing the angle of bend thereon.

To those skilled in the art, many modifications and variations of the present invention are possible in light of the above teachings. It is therefore to be understood that the present invention can be practiced otherwise than as specifically described herein and still be within the spirit and scope of the appended claims.

What is claimed is:

1. A tactile bumper for obtaining sensory information, for impact detection and collision avoidance, from the entire perimeter of an associated autonomous mobile robot or platform, comprising:
a housing;
a plurality of free-floating strips encased in said housing, and being disposed therein in a spring-loaded fashion so as to normally be in an extended position;
a plurality of microswitches affixed to said housing, and each being arranged behind portions of corresponding ones of said plurality of free-floating strips in such a fashion so that any displacement thereof will cause activation of the one of said plurality of microswitches nearest to the point of displacement; and
a plurality of free-floating corner pieces, each being configured with angled cuts at ends thereof so as to mate with complementary angled cuts in ends of juxtaposed ones of said plurality of free-floating strips so that any displacement of any one of said plurality of free-floating corner pieces will cause it to press against one of said juxtaposed ones of said plurality of free-float strips, causing it, in turn, to activate the one of said plurality of microswitches nearest to the point of displacement.

2. The tactile bumper of claim 1 wherein said housing includes a plurality of encasings.

3. The tactile bumper of claim 2 wherein said plurality of free-floating strips are slidably fitted into corresponding ones of said plurality of encasings.

4. The tactile bumper of claim 2 wherein said housing further includes a plurality of support brackets each being configured to join and support juxtaposed ones of said plurality of encasings at the ends thereof.

5. The tactile bumper of claim 4 wherein said housing further includes a plurality of support plates affixed near the ends of corresponding ones of said plurality of encasings for support thereof, and for the mounting of corresponding ones of said plurality of microswitches.

6. The tactile bumper of claim 5 wherein on each of the longer ones of said plurality of encasings, an additional one of said plurality of support plates is affixed near the middle thereof for added support and for mounting of an additional one of said plurality of microswitches.

7. The tactile bumper of claim 6 wherein each of said plurality of microswitches includes a microswitch actuator which protrudes through associated ones of said plurality of support plates and said plurality of encasings so that each one of said plurality of microswitches is activated by its microswitch actuator when said corresponding ones of said plurality of free-floating strips are displaced.

8. The tactile bumper of claim 7 further including a plurality of extension springs, each one thereof being affixed to each corresponding one of said plurality of support plates so as to protrude through an associated one of said plurality of encasings, and so that when each of said corresponding ones of said plurality of free-floating strips are displaced, it is then returned to its extended position by the one of said plurality of extension springs nearest the point of displacement.

9. The tactile bumper of claim 8 wherein the angle of the angled cuts are chosen to permit lateral motion of said plurality of free-floating strips and said free-floating corner pieces within associated ones of said plurality of encasings of said housing when responding to oblique impacts.

* * * * *